F. T. GRACEY.
TRUCK.
APPLICATION FILED JUNE 15, 1908.

907,035.

Patented Dec. 15, 1908.
2 SHEETS—SHEET 1.

Witnesses
C. E. Smith.
C. D. Davis

Inventor
Frank T. Gracey
By R. W. Bishop
Attorney

F. T. GRACEY.
TRUCK.
APPLICATION FILED JUNE 15, 1908.

907,035.

Patented Dec. 15, 1908.
2 SHEETS—SHEET 2.

UNITED STATES PATENT OFFICE.

FRANK T. GRACEY, OF CLARKSVILLE, TENNESSEE.

TRUCK.

No. 907,035.  Specification of Letters Patent.  Patented Dec. 15, 1908.

Application filed June 15, 1908. Serial No. 438,625.

*To all whom it may concern:*

Be it known that I, FRANK T. GRACEY, a citizen of the United States of America, residing at Clarksville, in the county of Montgomery and State of Tennessee, have invented certain new and useful Improvements in Trucks, of which the following is such a full, clear, and exact description as will enable others skilled in the art to which it appertains to make and use the same.

The object of this invention is to facilitate the handling of tobacco-filled hogsheads and that object is attained by certain improvements in the warehouse truck whereby the hogshead may be accurately and rapidly placed in position all of which will be hereinafter fully set forth, the novel features being subsequently particularly pointed out in the claims.

Figure 5:
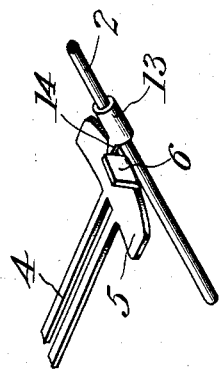
Figure 1:
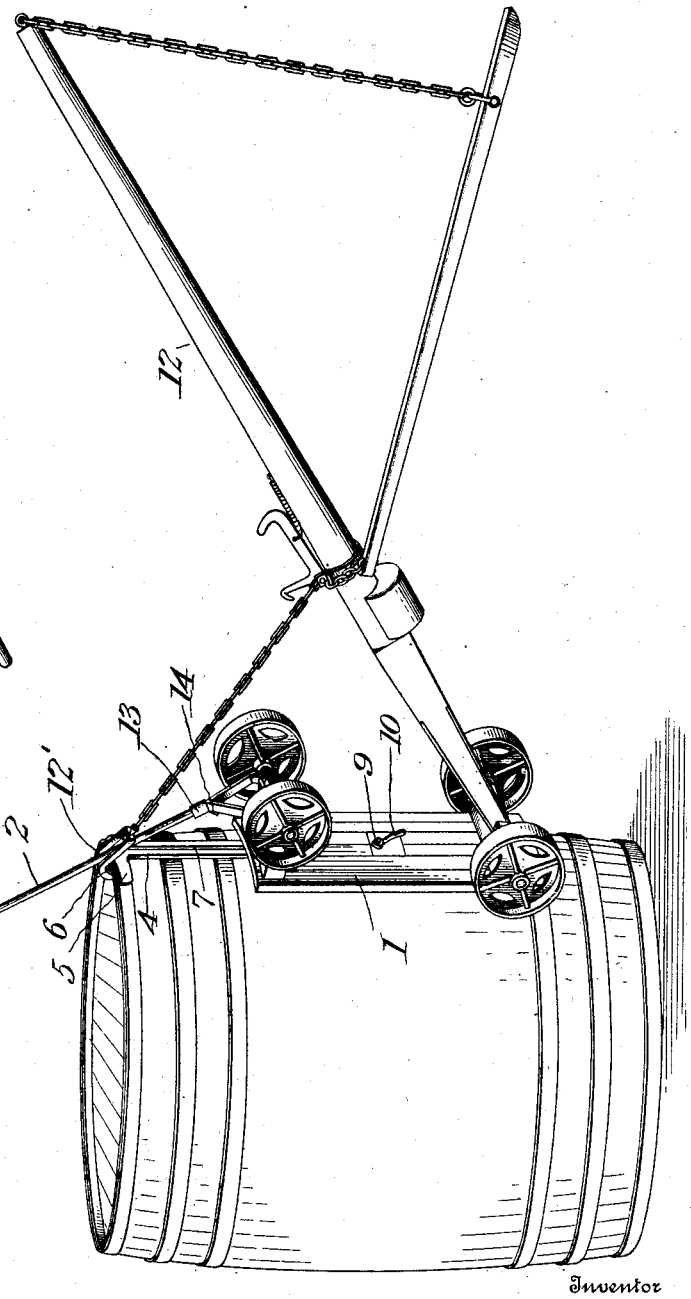
Figure 2:
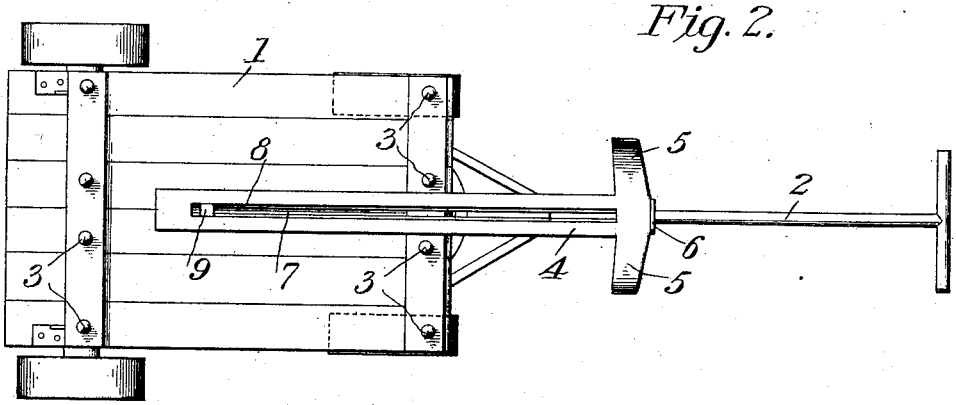
Figure 3:
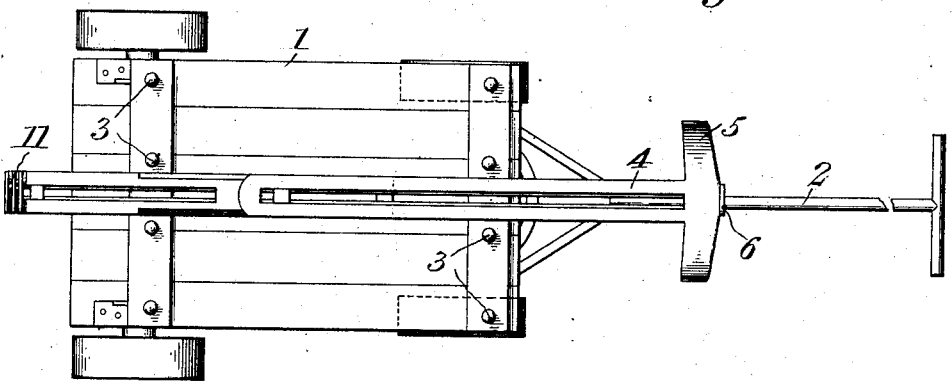
Figure 4:
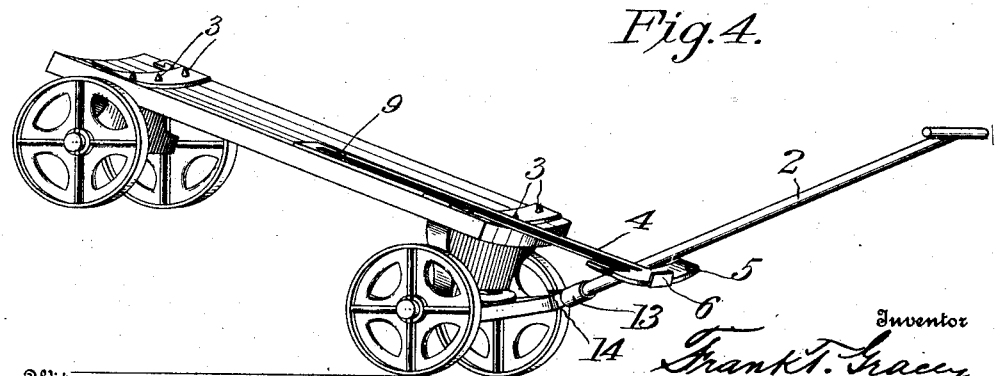

In the annexed drawings, Figure 1 is a perspective view showing the truck suspended on a hogshead and a pulling-over lever fitted in operative position upon the hogshead and the truck. Fig. 2 is a plan view of the truck, and Fig. 3 is a similar view showing a different form of gage-bar. Fig. 4 is a perspective view illustrating the manner of quickly bringing the truck into position at a desired point, and Fig. 5 is a detail view showing how the handle may be held up out of the way when the truck is on a scale.

The truck, 1, has front and rear axles upon which are mounted carrying wheels and to the front axle is attached a handle, 2, by which it may be drawn from place to place. The truck also has the usual concave upper surface and the transverse rows of points or spurs, 3, to receive the hogshead and prevent undue lateral movement of the same. Upon the upper side of the truck, I secure a central longitudinal bar, 4, the end of which projects beyond the front end of the truck and is provided with lateral wings, 5, which are concave so as to fit firmly against the side of the hogshead while immediately beyond said wings the end of the bar is turned up to form a beak or lip, 6, adapted to engage over the edge of the top chime of the hogshead and thereby suspend the truck thereon. The bar is adjustably secured upon the truck in order that the beak may be shifted from or toward the end of the truck according to the length of the hogshead. In the drawings, I have shown the bar constructed with a longitudinal slot, 7, having shouldered or countersunk walls, indicated at 8, and a securing bolt, 9, inserted through said slot and the body of the truck, a winged nut, 10, being mounted on the end of the bolt and adapted to be turned home against the bottom of the truck to clamp the bar rigidly in place. The head of the bolt, it will be understood, engages the shouldered or countersunk portion of the walls of the slot 7 so as to hold the bar firmly and at the same time not interfere with the hogshead lying evenly on the truck. In Fig. 3, I have shown the bar constructed in overlapping members with one member projecting beyond the rear end of the truck and teeth or corrugations, 11, formed on the upper surface of the bar to resist any tendency of the hogshead to slip.

As hogsheads are considerably longer than the truck bed, it is ordinarily difficult to see the truck and position the same accurately when lowering a hogshead thereon from a crane or rolling one on from the side. The end of the gage bar, however, can be easily seen so as to guide the loading of the hogshead on to the truck. As the bars are of spring steel they will not be easily broken or bent out of line by the weight of a hogshead striking the same in loading or tilting forward or rearward during hauling. In order to quickly and accurately bring the truck into position to receive a hogshead, the handle may be whipped over one of the lateral wings 5 and the rear end of the truck then elevated, as shown in Fig. 4, by pressing downward against the wing with the handle. The active wheel base of the truck being thus reduced, the work of wheeling the truck into the desired position is greatly hastened. When it is desired to pull over a hogshead which is standing on end, the truck is suspended on the hogshead, as shown in Fig. 1, by engaging the beak 6 over the chime of the hogshead with the wings 5 bearing against the side thereof. A lever, 12, being then brought into play, the hogshead is pulled over with the truck and will rest thereon in position to be hauled to the desired point. In suspending a truck upon a hogshead, the handle is brought up against the T-head presented by the end of the gage-bar and the wings thereon to initially tilt the truck upward after which the wings are grasped as handles to lift the truck into its place on the hogshead. It will be observed that the lever I use to tilt the hogshead carries a hook 12′ which ordinarily will straddle the handle of the truck to engage the chime. The wings at the end of the gage bar will lie under this hook and be thereby held against the hogshead during falling. Sometimes the roof of the car is so low that the truck handle can not project above the hogshead as shown in Fig. 1 but must be turned to the side. In this event the hook bears directly upon the wings so as to hold them against the hogshead and thereby maintain the truck in its proper position relative to the hogshead. These wings 5, furthermore, present handles or bearing plates against which workmen may press to prevent swaying of the truck as the hogshead turns over.

In order that the handle may be held up out of the way while the hogshead is being weighed, I mount thereon a ring or collar, 13, having a spur or toooth, 14, adapted to engage the end of the gage bar and thereby hold the handle against dropping. This ring or collar may be adjusted so that the tooth will engage the chime of the hogshead and thereby hold the handle in the event of the roof of the car or warehouse being so low as to necessitate the handle being turned to one side while the truck is suspended on the hogshead.

Having thus described my invention, what I claim and desire to secure by Letters-Patent is:—

1. A truck for hauling hogsheads provided with a gage bar projecting beyond its end and adapted to engage the end of a hogshead.

2. A truck having a central longitudinal gage bar adjustably secured upon its bed, the end of the bar projecting beyond the truck.

3. A truck having a bar projecting from its end and provided with lateral wings adapted to be engaged by the handle of the truck.

4. A truck having a gage bar projecting from its end, said gage bar being formed with lateral concave wings to bear against the side of a hogshead and with a beak or lip between said wings to engage over the chime of the hogshead.

5. The combination with a truck and its handle, of a gage bar projecting from the end of the truck, and a collar mounted on the handle and having a tooth adapted to engage the gage bar.

In testimony whereof, I have signed this specification in the presence of two subscribing witnesses.

FRANK T. GRACEY.

Witnesses:
W. B. KINCANNON,
ROBT. ONEAL.